US011208948B2

(12) United States Patent
Takahashi

(10) Patent No.: US 11,208,948 B2
(45) Date of Patent: Dec. 28, 2021

(54) POWER GENERATOR

(71) Applicant: HONDA MOTOR CO., LTD., Tokyo (JP)

(72) Inventor: Chisako Takahashi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/665,212

(22) Filed: Oct. 28, 2019

(65) Prior Publication Data

US 2020/0208572 A1 Jul. 2, 2020

(30) Foreign Application Priority Data

Dec. 28, 2018 (JP) .............................. JP2018-248097

(51) Int. Cl.
| F02B 63/04 | (2006.01) |
| F02D 29/06 | (2006.01) |
| H02K 5/20 | (2006.01) |
| H02K 9/04 | (2006.01) |
| H02K 5/24 | (2006.01) |

(52) U.S. Cl.
CPC ............ *F02B 63/044* (2013.01); *F02D 29/06* (2013.01); *H02K 5/20* (2013.01); *H02K 5/24* (2013.01); *H02K 9/04* (2013.01); *F05B 2260/96* (2013.01)

(58) Field of Classification Search
CPC ...... F02B 63/044; F02B 63/048; F02D 29/06; H02K 5/20; H02K 9/04; H02K 5/24; H02K 9/06; H02K 7/1815; F05B 2260/96
See application file for complete search history.

(56) References Cited

U.S. PATENT DOCUMENTS

| 4,540,888 A * | 9/1985 | Drewry ..................... B60P 3/32 290/1 R |
| 5,297,517 A * | 3/1994 | Brandt ..................... F02B 77/13 123/198 F |
| 6,100,599 A * | 8/2000 | Kouchi ..................... F02B 63/04 290/1 A |
| 7,485,019 B1 * | 2/2009 | Macier ..................... B63H 20/32 181/204 |
| 2004/0169373 A1 * | 9/2004 | Wolaver ..................... F02B 77/13 290/1 A |
| 2009/0056668 A1 * | 3/2009 | Hazelton ..................... F02B 77/13 123/198 E |
| 2013/0187392 A1 * | 7/2013 | Janscha ..................... H02K 7/1815 290/1 A |
| 2014/0271132 A1 * | 9/2014 | Le Roy ..................... F01P 5/02 415/119 |
| 2016/0258355 A1 * | 9/2016 | Zuroski ..................... F02B 77/13 |
| 2017/0260901 A1 * | 9/2017 | Wilhelm ..................... F02B 63/044 |

FOREIGN PATENT DOCUMENTS

JP 4145899 9/2008

* cited by examiner

*Primary Examiner* — Joseph J Dallo
*Assistant Examiner* — Kurt Philip Liethen
(74) *Attorney, Agent, or Firm* — Rankin, Hill & Clark LLP

(57) ABSTRACT

The power generator comprises an engine, an alternator to be driven by the engine, and shrouds that cover at least a part of the engine, and each of the shrouds is formed of a shroud main body member and a sound absorbing member.

2 Claims, 6 Drawing Sheets

POWER GENERATOR

INCORPORATION BY REFERENCE

The present application claims priority under 35 U.S.C. § 119 to Japanese Patent Application No. 2018-248097 filed on Dec. 28, 2018. The content of the applications is incorporated herein by reference in its entirety.

BACKGROUND OF THE INVENTION

Field of the Invention

The present invention relates to a power generator.

Description of the Related Art

Heretofore, there has been known an apparatus that comprises an engine, a power generator, and a casing to store these components, and that rotates a crank shaft of the engine to drive the power generator and to generate power. It is known that in such an apparatus, a fan is provided which blows cooling air to cool the engine, and to further guide this cooling air, a shroud that covers the engine is provided (e.g., see Japanese Patent No. 4145899).

Furthermore, to suppress operating sound or exhaust sound of the engine in the above described apparatus, sheet-like sound absorbing members may be provided on an inner surface of the casing, and a front surface and a back surface of the above described shroud, respectively.

SUMMARY OF THE INVENTION

When sheet-like sound absorbing members are provided in a casing and a shroud, however, the members need to be attached by using an attaching member such as a clip. Furthermore, the sound absorbing member to be attached is for use only with a constant thickness, and may have a region that does not fit a shape of the shroud. Consequently, the number of operation steps in an assembling process of a power generator and the number of components may increase.

It is an object of the present invention to provide a power generator that is capable of inhibiting the number of operation steps in an assembling process and the number of components from being increased.

A power generator of an aspect of the present invention comprises an engine, an alternator to be driven by the engine, and a shroud that covers at least a part of the engine, wherein the shroud is formed of a shroud main body member and a sound absorbing member.

In the above power generator of the aspect of the present invention, at least a part of the shroud main body member is formed in a frame shape, and the sound absorbing member covers the part of the shroud main body member which is formed in the frame shape, and is formed around both surfaces of the shroud main body member.

In the above power generator of the aspect of the present invention, the power generator further comprises a casing in which the engine, the alternator and the shroud are stored, wherein the sound absorbing member is formed in a shape along at least one of an inner shape of the casing and a shape of the engine.

In the above power generator of the aspect of the present invention, the sound absorbing member is made of a foam material.

According to the aspect of the present invention, the number of operation steps in an assembling process and the number of components can be inhibited from being increased.

DETAILED DESCRIPTION OF THE PREFERRED EMBODIMENT

Hereinafter, an embodiment of the present invention will be described with reference to the drawings.

Figure 1:
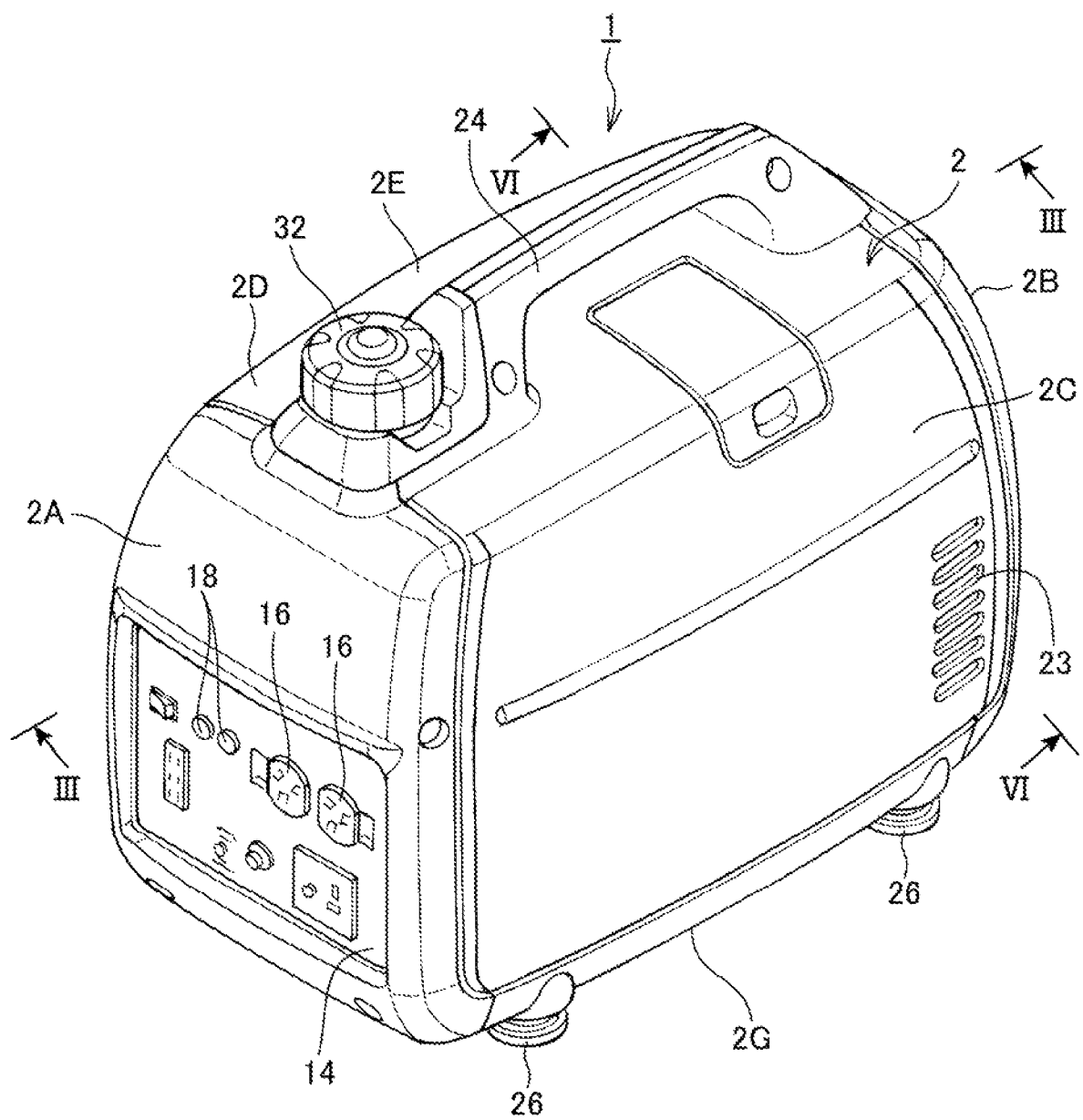
FIG. 1 is a perspective view showing an appearance of a power generator according to an embodiment of the present invention.
Figure 2:
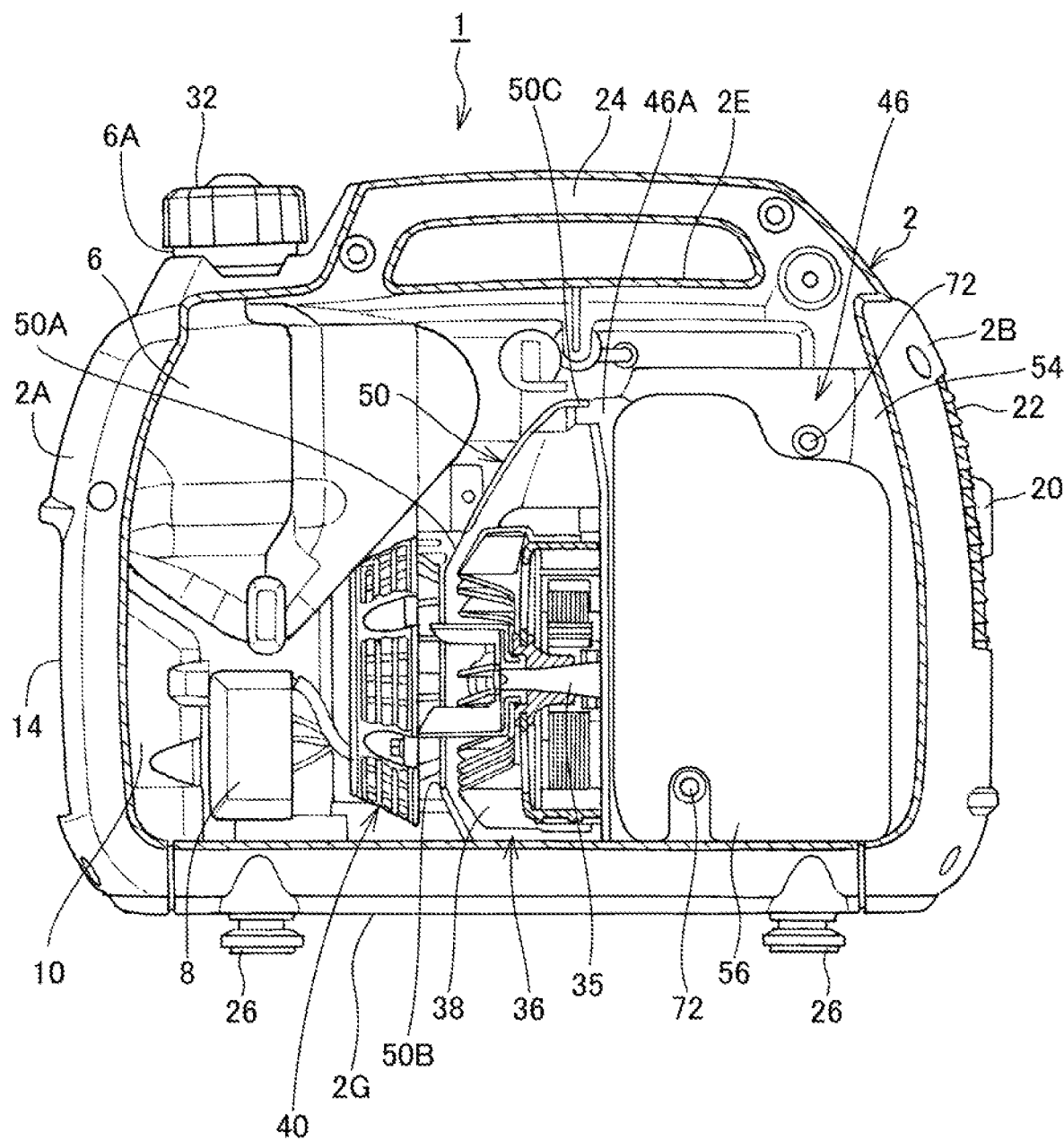
FIG. 2 is a side view of the power generator.

FIG. 1 is a perspective view showing an appearance of a power generator 1 according to the embodiment of the present invention, and FIG. 2 is a side view of the power generator 1. Note that FIG. 2 omits a part of a casing 2 that covers a side surface of the power generator 1 and a part of a fan cover 50, and shows cross sections of an alternator 36 and a fan 38.

The power generator 1 of the present embodiment is an engine power generator in which the alternator 36 (FIG. 3) is driven by an engine 34 (FIG. 3) to generate power.

As shown in FIG. 1, the power generator 1 comprises the casing 2 that forms an outer frame of the power generator 1. As shown in FIG. 2, in the casing 2, the engine 34, the alternator 36, a fuel tank 6, an inverter 8 and a control unit 10 are stored.

The casing 2 is made of a resin, and formed in a rectangular parallelepiped shape. A control panel 14 in which a plurality of power outlets 16, operation buttons 18 and the like are arranged is mounted to a lower part of a front surface 2A of the casing 2. Furthermore, in a side plate of a portion of the casing below the control panel 14, air intake ports (not shown) through which outside air is taken into the casing are formed.

In a rear surface 2B of the casing 2, there are provided an exhaust gas discharge port 20 through which an exhaust gas of the engine 34 is discharged, and a cooling air discharge port 22 through which the cooling air is discharged out of the casing 2.

Furthermore, air intake openings 23 through which the outside air is taken into the casing 2 are provided in regions of both side surfaces 2C and 2D of the casing 2 which are located on a rear surface 2B side.

On a top surface 2E of the casing 2, a handle 24 with which the power generator 1 is carried is provided, and on a bottom surface 2G of the casing 2, a plurality of legs 26 that support the casing 2 are attached.

Figure 3:
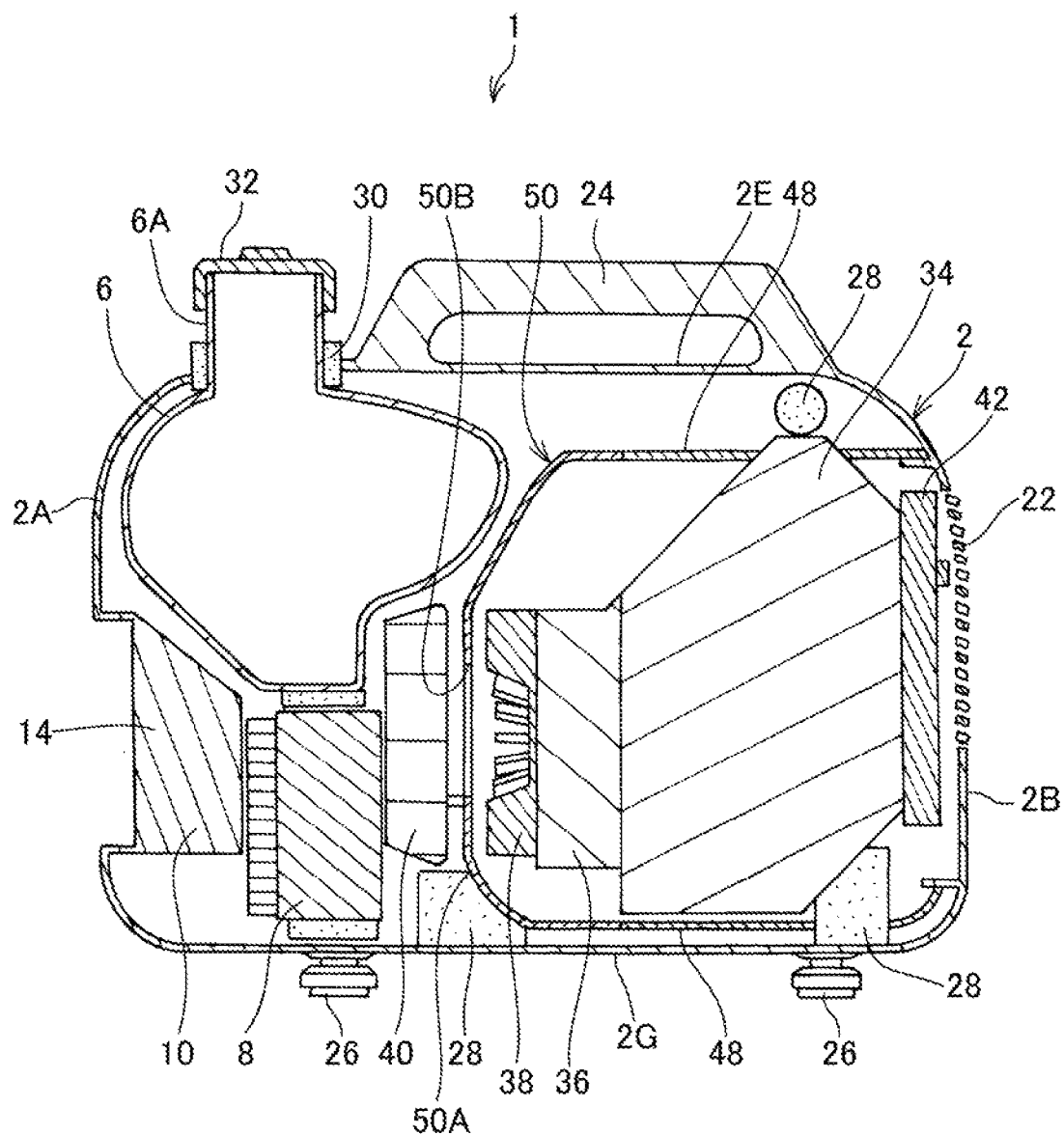
FIG. 3 is a view schematically showing a cross section taken along the III-III line of FIG. 1.

FIG. 3 is a view schematically showing a cross section taken along the line of FIG. 1.

As shown in FIG. 3, the engine 34 and the alternator 36 are arranged on a rear side (a right side in FIG. 2, the rear surface 2B side) in the casing 2. Furthermore, the engine 34 is elastically supported in the casing 2 via a plurality of rubber mounts 28.

Furthermore, the fuel tank 6 is stored on a front surface 2A side in the casing 2.

A refueling port 6A extends from a top surface of the fuel tank 6, and the refueling port 6A extends through the top surface 2E of the casing 2 to protrude outwardly. A gap between the top surface 2E of the casing 2 and the refueling port 6A is closed with a rubber seal 30. Additionally, a refueling cap 32 to open and close the refueling port 6A is removably attached to the refueling port 6A.

The inverter 8 that controls an output frequency of the alternator 36 is provided below the fuel tank 6. The inverter 8 includes a substrate that constitutes the inverter 8, and an element mounted on the substrate.

Furthermore, in a region located on a back surface of the control panel 14, a control unit 10 that controls operations of the engine 34 and the alternator 36 is provided.

Next, the engine 34 and the alternator 36 will be described in detail.

Figure 4:
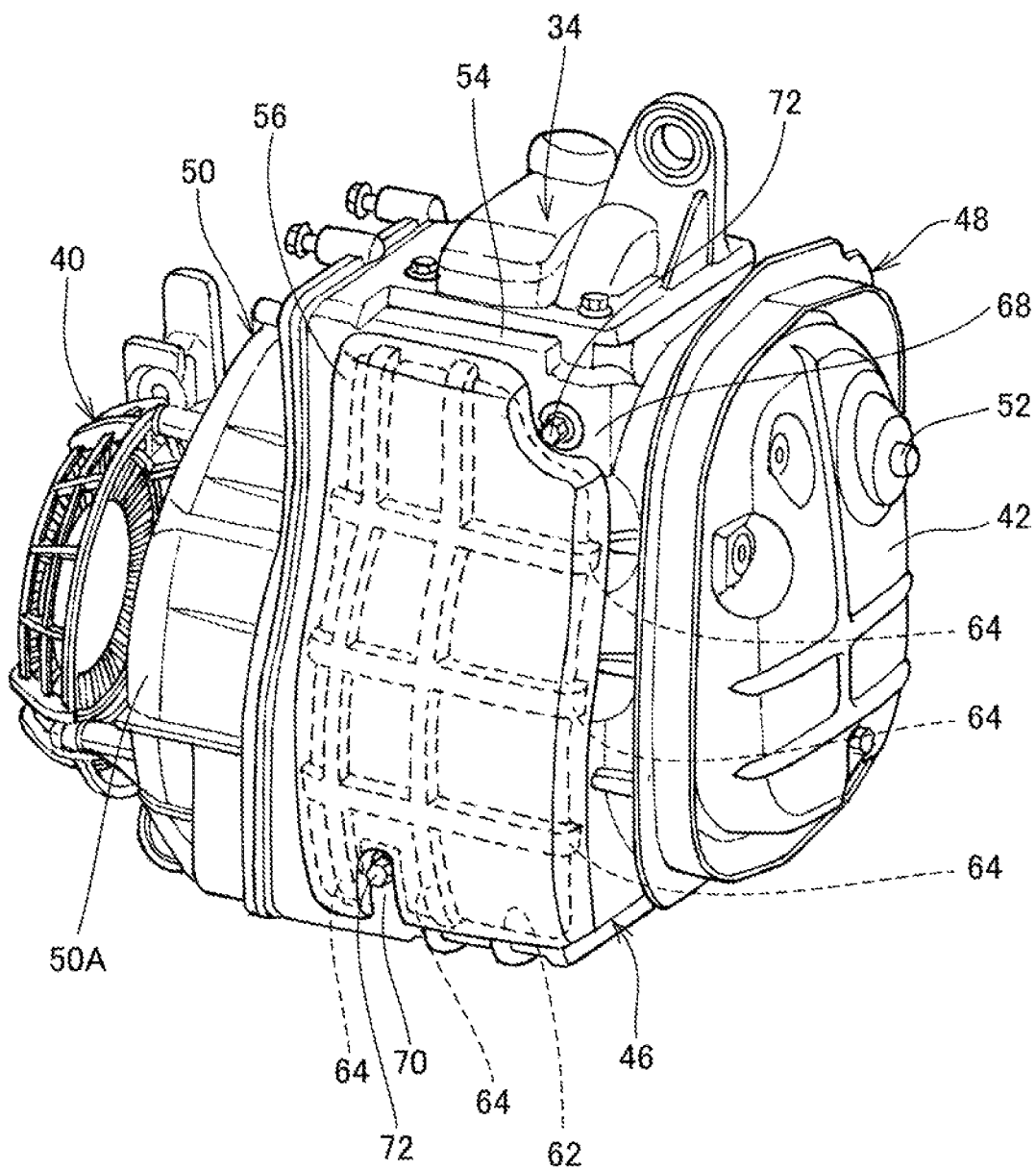
FIG. 4 is a perspective view showing a state of an engine covered with a shroud.

FIG. 4 is a perspective view showing a state of the engine 34 covered with shrouds 46 and 48.

Figure 6:
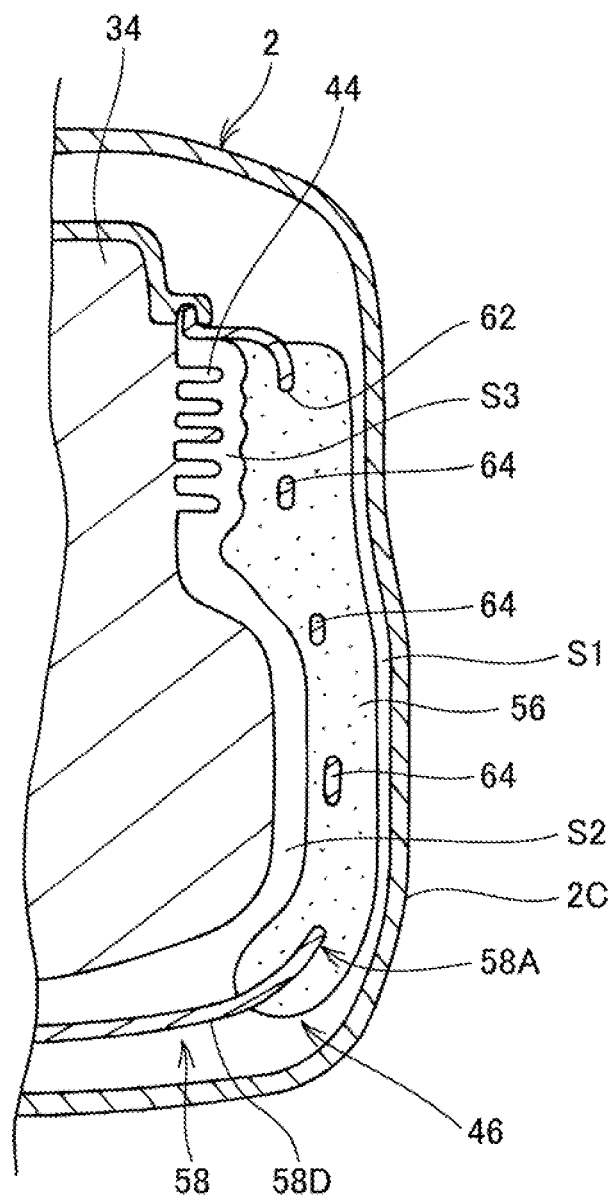
FIG. 6 is a view schematically showing a cross section taken along the VI-VI line of FIG. 1.

The engine 34 comprises a cylinder, a combustion chamber, and a crank chamber, and the cylinder is provided with a plurality of heat dissipation fins 44 (FIG. 6).

A front surface of the engine 34 is located on the front surface 2A side of the casing 2, and an output shaft 35 protrudes from the front surface of the engine 34. Furthermore, a muffler 42 is provided on a rear surface of the engine 34. Furthermore, both side surfaces of the engine 34 are covered with a pair of shrouds 46 and 48, respectively.

The alternator 36 is a power generator driven and rotated to generate power, and the alternator 36 is attached to the output shaft 35 that protrudes outwardly from the front surface of the engine 34, coaxially with the output shaft 35.

Furthermore, the fan 38 is attached to the alternator 36 coaxially with the alternator 36 on the front surface 2A side of the casing 2. The fan 38 is driven and rotated to cool the engine 34, and the respective members stored in the casing 2, for example, the inverter 8 and others.

The alternator 36 and the fan 38 are covered with the fan cover 50. The fan cover 50 is formed in a tapered manner so that a region located on the front surface 2A side of the casing 2 has a smaller diameter, and a ventilating opening 50B is formed in a front end portion 50A of the fan cover 50. The ventilating opening 50B is formed concentrically with a rotary shaft of the engine 34.

A recoil 40 starts the engine 34, when a recoil rope is operated to manually rotate the recoil. This recoil 40 is fixed to an outer side of the ventilating opening 50B of the fan cover 50 with bolts or the like.

The muffler 42 includes an exhaust port 52, and the exhaust port 52 is connected to the exhaust gas discharge port 20.

Next, the pair of shrouds 46 and 48 will be described in detail.

Each of the shrouds 46 and 48 of the present embodiment is a plate-like member formed along a side surface shape of the engine 34. The respective shrouds 46 and 48 are formed to be plane symmetrical with each other via the engine 34. Hereinafter, one shroud 46 will be described, and the other shroud 48 has a similar constitution.

Figure 5:
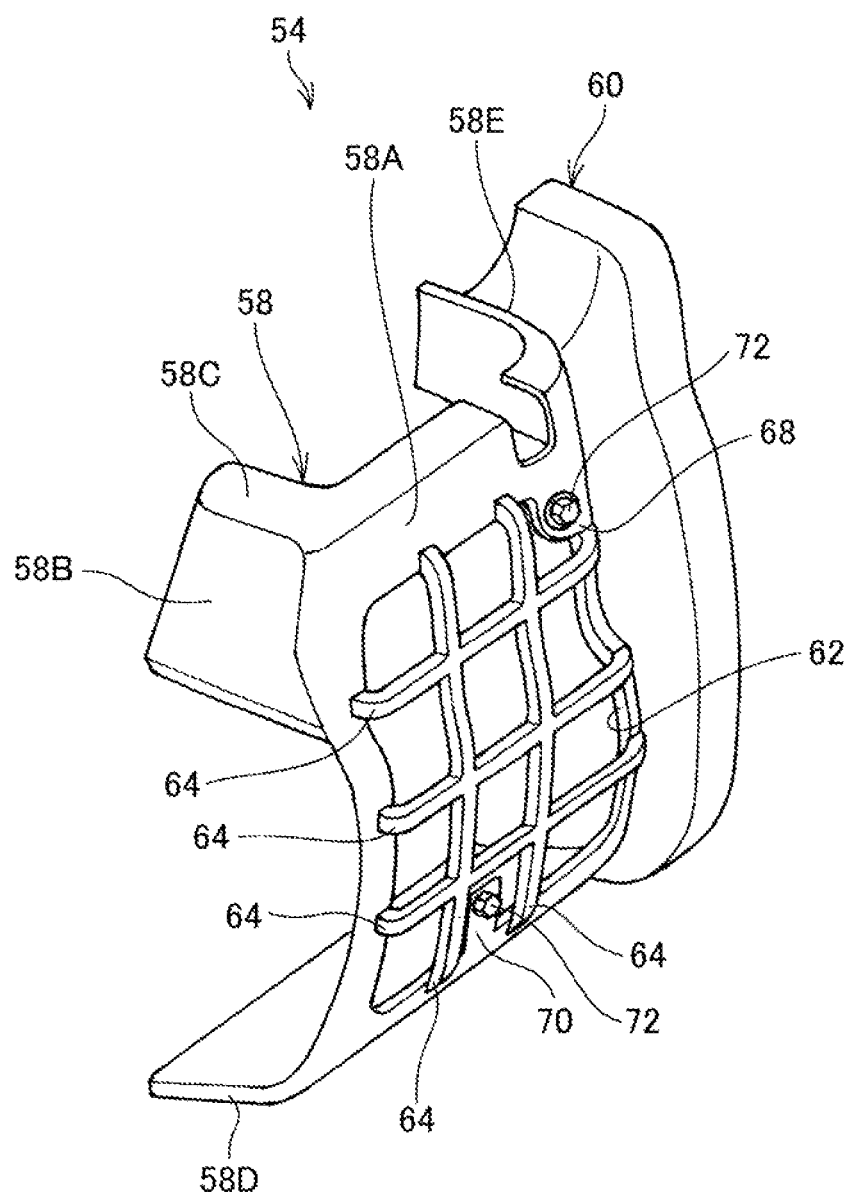
FIG. 5 is a perspective view schematically showing a shroud main body member.

FIG. 5 is a perspective view schematically showing a shroud main body member 54.

The shroud 46 is formed of the shroud main body member 54 and a sound absorbing member 56. The shroud main body member 54 and the sound absorbing member 56 are integrally formed.

The shroud main body member 54 is made of a solid material of a resin. As shown in FIG. 5, the shroud main body member 54 of the present embodiment has an engine covering section 58 that covers the engine 34, and a muffler covering section 60 that covers a side surface of the muffler 42, and the respective portions are formed along shapes of the engine 34 and the muffler 42, respectively.

The engine covering section 58 comprises a side surface covering portion 58A that covers the side surface of the engine 34, a front surface covering portion 58B that covers a part of the front surface of the engine 34, a top surface covering portion 58C that covers a part of a top surface, a bottom surface covering portion 58D that covers a part of a bottom surface, and a rear surface covering portion 58E that covers a part of the rear surface.

The side surface covering portion 58A is provided with a shroud opening 62 that is open almost throughout the side surface covering portion 58A. That is, the side surface covering portion 58A is formed in a frame shape.

Consequently, the shroud main body member 54 and the shroud 46 are reduced in weight.

Furthermore, the side surface covering portion 58A integrally comprises, in the shroud opening 62, a plurality of beam-like members 64 provided in a grid.

These beam-like members 64 also function as reinforcing members that improve strength of the shroud main body member 54. Furthermore, the beam-like members 64 also function as reinforcing members and support members for the sound absorbing member 56 described later, and forming of the sound absorbing member 56 is facilitated.

Note that an arbitrary number of the beam-like members 64 may be provided.

Additionally, the side surface covering portion 58A integrally comprises plate-like fixing portions 68 and 70 in regions located in an upper portion and a lower portion of the side surface covering portion 58A. The shroud 46 is fixed to the engine 34 with bolts 72 via these fixing portions 68 and 70.

FIG. 6 is a view schematically showing a cross section taken along the VI-VI line of FIG. 1.

The sound absorbing member 56 is formed by forming the sound absorbing member 56 integrally with the shroud main body member 54 formed in advance, and the sound absorbing member covers the shroud opening 62 of the shroud main body member 54 including the plurality of beam-like members 64.

The sound absorbing member 56 is made of a foam material having a sound absorbing function to absorb operating sound of the engine 34. An example of this foam material is foam plastic obtained by foaming a material of polyurethane, polystyrene, phenol resin or the like, and in the present embodiment, polyurethane is used.

In detail, as shown in FIG. 6, the sound absorbing member 56 covers all of the plurality of beam-like members 64, and also closes the shroud opening 62. That is, the sound absorbing member 56 forms a part of the shroud 46 as a plane.

Furthermore, the sound absorbing member 56 is formed with a predetermined thickness so that the thickness is larger than a thickness of the side surface covering portion 58A. Consequently, the sound absorbing member 56 is formed around both surfaces of the side surface covering portion 58A.

Additionally, the sound absorbing member 56 is a foam member as described above, and is formed in accordance with the shroud main body member 54. Consequently, the sound absorbing member can be formed comparatively easily.

In consequence, a surface of the sound absorbing member 56 located on a casing 2 side is formed along an inwardly located surface of a side surface 2C of the casing 2 via a gap S1.

Similarly, a surface of the sound absorbing member 56 located on an engine 34 side is formed along the side surface of the engine 34 via a gap S2.

Furthermore, a surface of the sound absorbing member 56 opposite to the plurality of heat dissipation fins 44 covers the heat dissipation fins 44 via a gap S3.

Thus, the sound absorbing member 56 can be formed in a shape that fits shapes of the side surface of the engine 34 and the inwardly located surface of the casing 2, while constituting a part of the shroud 46.

Additionally, the sound absorbing member 56 can be formed by varying the thickness in accordance with the side surface of the engine 34 and the inwardly located surface of the casing 2. Furthermore, a gap size of the gap S1, the gap S2 or the gap S3 between the shroud 46 and the casing 2 or the engine 34 can be arbitrarily defined.

Consequently, the sound absorbing member 56 having a sufficient thickness can be provided in a space between the engine 34 and the casing 2. Thus, a sound absorbing area of the sound absorbing member 56 can be acquired, and the operating sound of the engine 34 can be sufficiently absorbed. Furthermore, it is not necessary to provide a new sound absorbing member on the inwardly located surface of the casing 2. In consequence, the number of components of the power generator 1 and the number of operation steps during preparation of the power generator 1 can be decreased, and assembling properties can be improved.

In addition, the sound absorbing member 56 is the foam member as described above, and hence, the sound absorbing member 56 can be reduced in weight by varying a foaming ratio. Consequently, when a part of the shroud 46 is formed by the sound absorbing member 56, the shroud 46 can be reduced in weight.

Next, an operation of the present embodiment will be described.

In the power generator 1 of the present embodiment, the recoil 40 is rotated to drive the engine 34, and the alternator 36 is accordingly driven and rotated, to generate power. Simultaneously, the fan 38 is driven and rotated, and takes the outside air into the casing 2 through the air intake port and the respective air intake openings 23, to blow cooling air toward the engine 34.

In this case, the outside air taken inside through the respective air intake openings 23 passes through the gap S1 between the surface of the sound absorbing member 56 located on the casing 2 side and the inwardly located surface of the side surface 2C of the casing 2. Afterward, this outside air passes as the cooling air through the ventilating opening 50B of the fan cover 50, and passes through the gap S2 between the surface of the sound absorbing member 56 located on the engine 34 side and the side surface of the engine 34 to cool the engine 34.

As described above, the sound absorbing member 56 of the shroud 46 is formed in the shape that fits the outer shape of the engine 34 and the inner shape of the casing 2. Consequently, the cooling air can be more efficiently guided.

Furthermore, the shape of the sound absorbing member 56 is formed in accordance with the region where the member is disposed. Consequently, for example, a width of the gap S3 can be adjusted, and the cooling air can flow through heat dissipation members such as the plurality of heat dissipation fins 44 in a concentrated manner.

In consequence, cooling efficiency of the engine 34 can be improved.

Additionally, the shroud 46 is formed by integrally forming the sound absorbing member 56 and the shroud main body member 54.

Consequently, the sound absorbing member 56 can be fixed to the shroud main body member 54 without using any fixing members such as clips.

Therefore, the number of the components of the power generator 1 can be decreased, and the power generator can be reduced in weight. Furthermore, the number of the operation steps during the preparation of the power generator 1 can be decreased, and the assembling properties can be improved.

Furthermore, sealing properties of the shroud 46 can be improved. Consequently, leakage of the cooling air from the shroud 46 and leakage of the operating sound of the engine 34 can be suppressed.

The above described embodiment has the following effects.

The power generator 1 of the present embodiment comprises the engine 34, the alternator 36 to be driven by the engine 34, and the shrouds 46 and 48 that cover both the side surfaces of the engine 34. Furthermore, each of the shrouds 46 and 48 is integrally formed of the shroud main body member 54 and the sound absorbing member 56.

Consequently, the sound absorbing member 56 can be fixed to the shroud main body member 54 without using any fixing members such as the clips. Therefore, the number of the components of the power generator 1 can be decreased, and the power generator can be reduced in weight. Furthermore, the number of the operation steps during the preparation of the power generator 1 can be decreased, and the assembling properties can be improved.

Additionally, the sound absorbing member 56 can be formed by varying the thickness in accordance with the gap between the side surface of the engine 34 and the inwardly located surface of the casing 2.

Furthermore, according to the present embodiment, the side surface covering portion 58A of the shroud main body member 54 is formed in the frame shape, and the sound absorbing member 56 covers the side surface covering portion 58A, and is formed around both the surfaces of the shroud main body member 54. Consequently, the sound absorbing member 56 having a sufficient thickness can be provided in the space between the engine 34 and the casing 2, and the operating sound of the engine 34 can be sufficiently absorbed.

Additionally, according to the present embodiment, the sound absorbing member 56 is formed in the shape along the outer shape of the engine 34 and the inner shape of the casing 2. Thus, the gap size of the gap S1, the gap S2 or the gap S3 between the shroud 46 and the casing 2 or the engine 34 can be arbitrarily defined. Consequently, the cooling air can be more efficiently guided, and the cooling efficiency of the engine 34 can be improved.

Furthermore, according to the present embodiment, the sound absorbing member 56 is made of the foam material. Consequently, the shroud 46 can be reduced in weight by varying the foaming ratio of the sound absorbing member 56.

The above described embodiment illustrates one aspect of the present invention, and can be arbitrarily modified and applied without departing from the gist of the present invention.

For example, a muffler cover that covers the muffler 42 may be provided between the muffler 42 and the casing 2, and the muffler cover may be formed of a main body member and a sound absorbing member in the same manner as in the shrouds 46 and 48.

Furthermore, for example, in the above described embodiment, the side surface covering portion 58A of the shroud main body member 54 is provided with the shroud opening 62. However, the present invention is not limited to this example. The side surface covering portion 58A may be formed in a plane, and the sound absorbing member 56 may be formed in two colors on a surface of the plane.

REFERENCE SIGN LIST

1 power generator
2 casing
2A front surface
2B rear surface
2C and 2D side surface
2E top surface
2G bottom surface
6 fuel tank
6A refueling port
8 inverter
10 control unit
14 control panel
16 power outlet
18 operation button
20 exhaust gas discharge port
22 cooling air discharge port
23 air intake opening
24 handle
26 leg
34 engine
35 output shaft
36 alternator
38 fan
40 recoil
42 muffler
44 heat dissipation fin
46 and 48 shroud
50 fan cover
50A front end portion
50B ventilating opening
52 exhaust port
54 shroud main body member
56 sound absorbing member
58 engine covering section
58A side surface covering portion
58B front surface covering portion
58C top surface covering portion
58D bottom surface covering portion
58E rear surface covering portion
60 muffler covering section
62 shroud opening
64 beam-like member
68 fixing portion
70 fixing portion
S1 gap
S2 gap
S3 gap

What is claimed is:

1. A power generator comprising:
an engine having a side surface that curves, a front surface, a top surface, a bottom surface, and a rear surface;
an alternator to be driven by the engine;
a shroud that is in a plate shape and that covers at least a part of the engine, and,
a casing in which the engine, the alternator, and the shroud are stored, wherein
the shroud is a separate part from the casing, is disposed between a side surface of the casing and the side surface of the engine and comprises a shroud main body member and a sound absorbing member,
the shroud main body member defines a shroud opening, the shroud opening penetrates the shroud main body member in a thickness direction of the shroud main body member, and
the sound absorbing member, which is made of a foam material, is received in the shroud opening and extends in the thickness direction of the shroud main body member from one side to an other side of the shroud main body member throughout a length of the shroud opening and entirely closes the shroud opening, the sound absorbing member has, at the shroud opening, a thickness that is larger than a thickness of the shroud main body member such that the sound absorbing member forms, at the shroud opening, opposite surfaces of the shroud main body member,
the shroud main body member comprises, in the shroud opening, a plurality of beam-like members, each of said beam-like members having a beam shape so that the shroud main body member is formed in a frame shape,
the shroud main body member including the plurality of beam-like members is formed in a first shape that curves along a curving shape of the side surface of the engine,
the sound absorbing member covers the shroud opening including the plurality of beam-like members and is formed around opposite surfaces of the shroud main body member surrounding the shroud opening, the sound absorbing member is formed in a second shape along the curving shape of the side surface of the engine,
the sound absorbing member is formed apart via a first gap from an inwardly located surface of the side surface of the casing and is formed apart via a second pap from the side surface of the engine,
the thickness of the sound absorbing member varies in an up and down direction of the engine such that in the up and down direction, the thickness of the sound absorbing member is relatively large when a corresponding space between the side surface of the engine and the inwardly located surface of the side surface of the casing is relatively large and the thickness of the sound absorbing member is relatively small when the corresponding space is relatively small.

2. The power generator according to claim 1, wherein the sound absorbing member is formed in a shape along an inner shape of the casing.

\* \* \* \* \*